(12) United States Patent
Smirra

(10) Patent No.: US 6,289,669 B1
(45) Date of Patent: Sep. 18, 2001

(54) LATERAL-THRUST CONTROL ARRANGEMENT FOR MISSILES WITH SOLID-FUEL HOT-GAS GENERATOR

(75) Inventor: Karl Smirra, Wasserburg (DE)

(73) Assignee: LKF Lenkflugkörpersysteme GmbH, Munich (DE)

(*) Notice: Subject to any disclaimer, the term of this patent is extended or adjusted under 35 U.S.C. 154(b) by 0 days.

(21) Appl. No.: 09/257,420

(22) Filed: Feb. 25, 1999

(51) Int. Cl.$^7$ .................................................... F02K 1/00
(52) U.S. Cl. ................................................................ 60/229
(58) Field of Search ...................... 60/229, 228; 244/3.22

(56) References Cited

U.S. PATENT DOCUMENTS

| | | | |
|---|---|---|---|
| 2,974,594 | * 3/1961 | Boehm | 244/3.22 |
| 4,017,040 | * 4/1977 | Dillinger et al. | 244/3.22 |
| 4,384,690 | * 5/1983 | Brodersen | 244/3.22 |
| 4,463,921 | * 8/1984 | Metz | 244/3.22 |
| 5,016,835 | 5/1991 | Kraz | 244/3.22 |
| 5,456,425 | * 10/1995 | Morris et al. | 244/3.22 |
| 5,711,348 | * 1/1998 | Morash et al. | 137/875 |

FOREIGN PATENT DOCUMENTS

| | | |
|---|---|---|
| 1291206 | 3/1962 | (DE). |
| 3901041 | 1/1989 | (DE). |
| 0309327 | 3/1989 | (EP). |
| 2176446 | 12/1986 | (GB). |
| 2316464 | 2/1998 | (GB). |

* cited by examiner

*Primary Examiner*—Charles G. Freay
*Assistant Examiner*—Ehud Gartenberg
(74) *Attorney, Agent, or Firm*—Ladas and Parry

(57) ABSTRACT

A lateral-thrust control device for a four-quadrant final-phase guidance control of a missile having lateral-thrust nozzles (10) communicating with a solid-fuel gas generator (13). Each of the nozzles has a valve member (22, 38), whose open and closed states are controlled by a common actuator (12, 30) which is rotatable and axially displaceable to select one nozzle to be supplied with gas from the gas generator while the other nozzles are closed according to the required flight mode. The actuator is configured such that each of the lateral-thrust nozzles (20) can be individually controlled to be active or inactive, intermittently, and independently of one another. In one embodiment, the actuator is a cylindrical piston and in another is a conical member.

11 Claims, 3 Drawing Sheets

LATERAL-THRUST CONTROL ARRANGEMENT FOR MISSILES WITH SOLID-FUEL HOT-GAS GENERATOR

FIELD OF THE INVENTION

The invention relates to a lateral-thrust control arrangement, preferably for four-quadrant control of a missile. More particularly, the invention is directed to such an arrangement in which lateral thrust nozzles communicate with a solid-fuel gas generator via respective valves which are operated by a common actuator.

BACKGROUND AND PRIOR ART

Lateral-thrust nozzles fed by a solid-fuel gas generator, whose thrust is directed perpendicular to the longitudinal axis of the missile to be controlled, are known in the art.

Thus, for example, DE 3,901,041 shows a guided missile with a solid-fuel, hot-gas generator, whose hot gas passes through a multiple number of nozzles arranged regularly around the periphery of the missile and extending essentially perpendicularly to the longitudinal axis of the missile, and wherein the gas flow through the individual nozzles is controlled by means of a control device, which comprises a valve member for each nozzle, and a control star assigned to the valve members as an actuator, said control star having a number of arms corresponding to the number of nozzles, extending perpendicularly to the longitudinal axis of the missile, the control star being mounted so that it can be tilted all around the longitudinal axis of the missile, so that the nozzles can be controlled in a predetermined manner by a control device operated by means of electromagnets provided for each valve member in order to produce a lateral force to effect a change in the flight path of the missile.

When the control star is not actuated, the net effect of the thrusts of the lateral-thrust nozzles is canceled, and when the control stat is actuated, one predetermined lateral-thrust nozzle is supplied with hot gas, all the other nozzles being closed, so that the desired lateral force for the change in flight path is produced by the predetermined lateral-thrust nozzle.

The construction of the actuator as a control star permits only limited correcting movements for the valve members, which means only limited opening movements for the valve members, and in particular, only one opening of the controller lateral-thrust nozzle is produced via the original aperture dimension as a consequence of a rigid coupling of the valve members of all lateral-thrust nozzles due to the tiltably mounted control star when the lateral-thrust nozzles to be shut off are closed, so that a constant hot-gas outflow is produced through all of the lateral-thrust nozzles both in the rest position of the control star as well as in its operative positions, due to the resulting constant aperture cross-section.

Although only one component direction is required each time to produce the lateral-thrust function, in the known control device, the lateral-thrust nozzles for all component directions must be continuously actuatable in operation in order to maintain the total control system. Because of this, it is a disadvantage that the continuously high and uncontrolled combustion of the solid-fuel as well as the thus-prevailing total thrust capacity in relation to the usable or, in fact, to only the necessary lateral thrust, remains essentially unutilized, so that a correspondingly higher, mass and volume of propellant are necessary for the required lateral-thrust control operation.

In order to avoid this disadvantage, the use of a thrust control of a solid-fuel propellant engine might be possible with the use of a hybrid technique, in such a way that the combustion-chamber pressure and thus the thrust of a solid-fuel propellant engine can be controlled in a defined region and thus the propellant can be utilized more efficiently for the lateral-thrust control by mixing a co-supplied oxidator or one introduced from the outside into the unfavorably balanced combustible solid-fuel rocket engine.

In such a case, the total thrust capacity can be regulated, if it is necessary, for lateral-thrust control.

Apart from the fact that such a system requires a very complex mixing technology, based on the required mixing zone, a large structural volume is also necessary, which is out of proportion to the requirement of a missile lateral-thrust control.

It is known in fact from DE 1,291,206, that for the control of pitch, yaw and roll movements of a jet airplane during takeoff and landing, the gas flow in jet nozzles arranged in pairs relative to the pitch, yaw and roll axes can be controlled by means of hollow cylindrical thrusters actuated by motor operators, to supply the gas inlets of each nozzle pair synchronously.

In this way, a constant quantity of pressurized gas is distributed to the pair of nozzles without changing the percentage of the total gas quantity diverted from the power unit of the airplane, such that the necessary equilibrium state can be maintained during takeoff and landing.

However, such rotary valves regulating the gas flow in gas lines arranged in pairs and their control cannot be used in lateral-thrust control arrangements of the above described type.

SUMMARY OF THE INVENTION

An object of the invention is thus to provide a control system, which operates more effectively than those previously known without using a hybrid technique for regulating a solid-fuel propellant and which do not have the disadvantages of the known lateral-thrust control arrangements, particularly in the idling state.

This object is achieved by means of a novel lateral-thrust control arrangement for missiles of the above described type by use of the known phenomenon, that the rate of combustion of a solid-fuel propellant for producing gas is a function of the combustion-chamber pressure, can be used as a parameter for the construction of the control arrangement.

Proceeding from a lateral-thrust control arrangement of the type described earlier herein, the invention provides that the actuator can be adjustably controlled between an idle and a thrust position by rotating and axially displacing the actuator according to the required flight path, the actuator being configured such that the lateral-thrust nozzles can be controlled to be active or inactive individually, intermittently and independently of one another.

According to a preferred embodiment of the invention, the actuator is designed as a pressure-unloaded rotary directional control valve, preferably as a piston that can move longitudinally back and forth and rotatably and wherein at least one flow channel opening at the peripheral surface of the control valve can be selectively brought into fluid communication with the lateral-thrust nozzles.

According to another embodiment of the invention, the actuator is constructed as a truncated cone mounted for rotation and longitudinal reciprocal movement and having at least one control groove assigned to the valve members, the valve members and the actuator being arranged with their active axes lying perpendicular to one another.

The valve members are preferably constructed as seat valves held in a spring-loaded open position and guided linearly by means of a rolling element mounted on the free end of a valve rod.

The configuration of the lateral-thrust control arrangement according to the invention makes possible, for the first time, an idling mode, in which the combustion-chamber pressure and thus the rate of combustion of the solid-fuel of the gas generator is low, and a thrust mode, in which the combustion-chamber pressure is high and thrust can be produced intermittently by means of a lateral-thrust nozzle in any direction in a Cartesian coordinate system. Since the propellant is utilized essentially only for producing thrust in a selected direction in the Cartesian system and not also for maintaining a total-thrust capacity of the actuator, which heretofore had to be maintained for the continuous thrust feed for the lateral-thrust nozzles in all directions, its consumption is minimized, and the construction cost for the lateral-thrust control arrangement according to the invention is thus significantly reduced and the actuator arrangement is lighter in weight. In addition, the design of the lateral-thrust control arrangement according to the invention makes possible a particularly simple configuration of the control of a missile controlled by lateral thrust, since a single structural element serves for controlling the quantity of gas flow and thereby the magnitude and direction of thrust.

The control of the lateral-thrust nozzles can be obtained directly or indirectly, whereby in the latter case, separate components are inserted as blocking members between the actuator and the inlets of the lateral-thrust nozzles. It is advantageous both in the case of indirect control by a central control piston mounted in a rotatable and axially displaceable manner, as well as for direct lateral-thrust nozzle control that the recoil force of the opposite lateral-thrust nozzle or the combustion-chamber pressure itself can be used for producing a sealing force, which leads to a higher system tightness. This is particularly important for small lateral-thrust nozzle openings.

DETAILED DESCRIPTION

Figure 2:
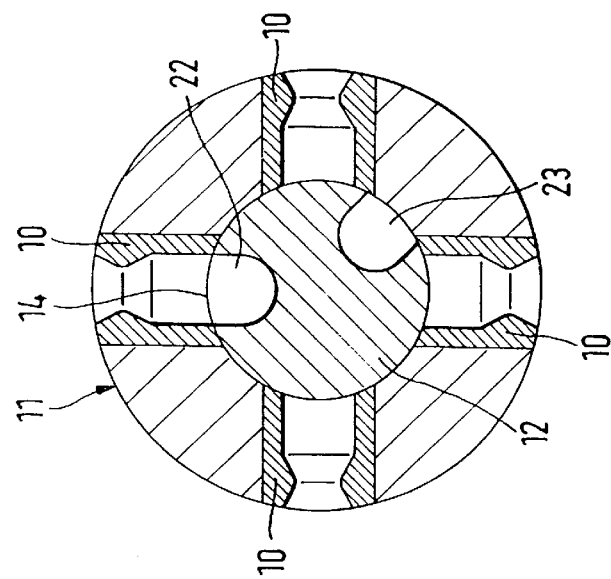
FIG. 2 is a section taken along line II—II in FIG. 1.
Figure 1:
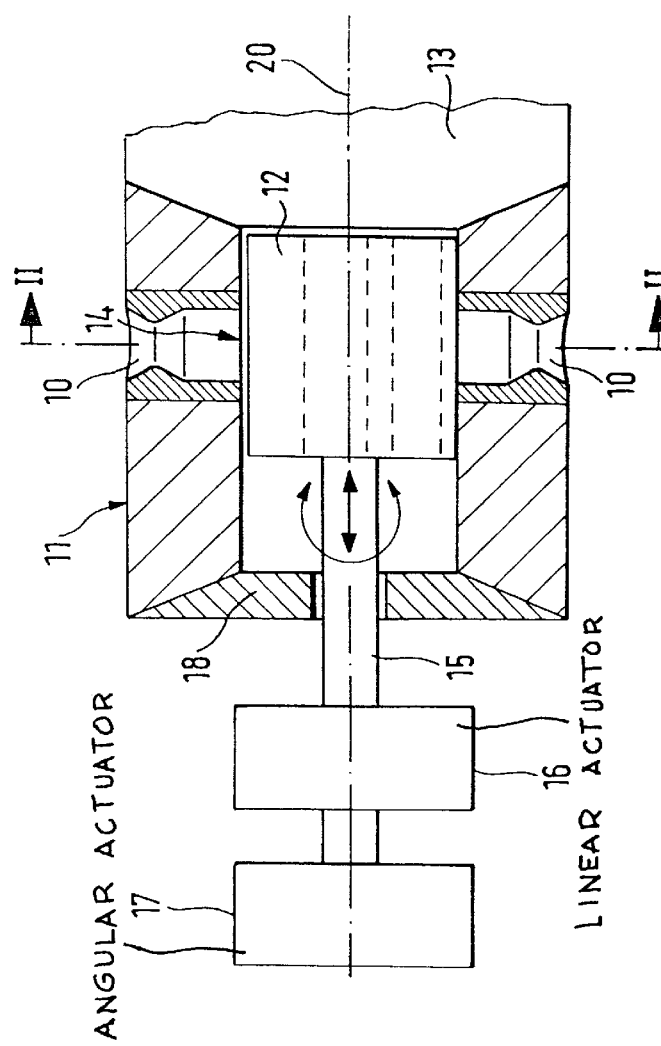
FIG. 1 is a section through a first embodiment of a lateral-thrust control arrangement according to the invention wherein the actuator is in a controlled flight mode.

A self-actuated missile (not shown here in detail) has for its final-phase guidance, as shown in FIGS. 1 and 2, four lateral-thrust nozzles 10 arranged in opposed pairs at right angles to one another. The nozzles face in opposite directions along the X and Y axes of a Cartesian coordinate system. The nozzles are controlled intermittently and individually by means of a central actuator constructed as a control piston 12 mounted in missile structure 11. The actuator is disposed directly at the nozzle inlet 14 as shown or upstream thereof (not shown). The actuator can be rotated around a central axis 20 by means of a piston rod 15 to which is connected, an angular actuator 16 and the central actuator can be moved axially back and forth along the central axis 20 by a linear actuator 17 also connected to piston rod 15.

Control piston 12 has one or more flow channels 22, 23 extending in the axial direction at the periphery of the piston along the entire length of the piston to receive gases from a combustion chamber 13, (illustrated schematically) and supply the gases to the lateral-thrust nozzles, as a function of the angular position of the control piston 12. The angular position of control piston 12 is adjusted by angular actuator 16 in response to a guidance control of the missile, (not shown). In positions in which no flow channel 22 is connected to one of the lateral-thrust nozzles at the corresponding peripheral position, the respective piston surface area serves as a flow sealing means. As a consequence of the provision of two flow channels 22 and 23 at the surface of the piston, the rotational force to control angular movement of piston 12 can be minimized for initiating movement of the piston to the respective lateral-thrust nozzle, and the reaction characteristics of the final-phase guidance, can be optimized.

The mode of operation of the above-described arrangement is as follows:

In the idling mode, the control piston 12 is moved by linear actuator 17 to the left in FIG. 1 to a final position (not shown), against a stop at a front wall 18 of structure 11 serving as a bearing for piston rod 15, so that all inlets 14 of the lateral-thrust nozzles are open to combustion chamber 13. A high pressure in combustion-chamber 13 cannot be built up in this control position, since all lateral-thrust nozzles are open and the solid combustion fuel of the gas generator is combusted with minimized rate of combustion and thus very sparsely.

The idling pressure ratios for assuring a stable combustion may be adjusted by the axial position of the control piston. In addition, the pressure/time gradient for the build-up and release of the combustion-chamber pressure can be adjusted by an appropriate control program for the axial displacement of the control piston.

In the thrust mode, control piston 12 for the lateral-thrust nozzle 10 to be activated is rotated by; means of angular actuator 16 and then linearly by means of linear actuator 17, thus assuming the control position shown in FIGS. 1 and 2.

Here, three of the four nozzle inlets 14 which are arranged in a Cartesian coordinate system at the 0°, 90°, 180° and 270° angular positions are blocked. In this way, the pressure in the combustion chamber and the rate of combustion of the solid-fuel therein increase very rapidly, and a thrust is produced through the one unblocked lateral-thrust nozzle. This thrust also acts on control piston 12 and produces a compressive force on the corresponding inlet 14 of the lateral-thrust nozzle lying opposite the operative nozzle and thus increases the local leak-tightness of the piston in the actuator body.

The inlets of the lateral-thrust nozzles extending crosswise to the controlled lateral-thrust nozzle are equally pressurized, and any flow losses due to gaps, result in equilibrated lateral-thrust forces and therefore remain ineffective on the control.

Since the pressure in the combustion chamber rises when the piston 12 is moved to open a particular selected flow channel, a net axial force is applied to the piston to displace it (based on the ratio of the area of the piston to the area of the piston rod) when the piston returns to the idle mode and thereby the force to displace the piston is reduced.

Figure 4:
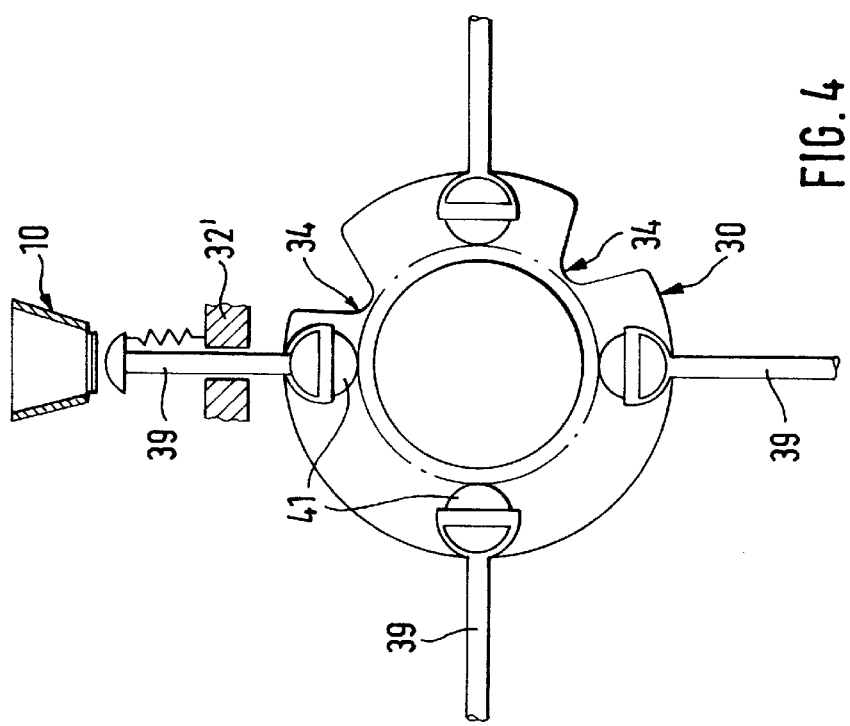
FIG. 4 is an end view from the left of the lateral-thrust control arrangement of the embodiment in FIG. 3.
Figure 3:
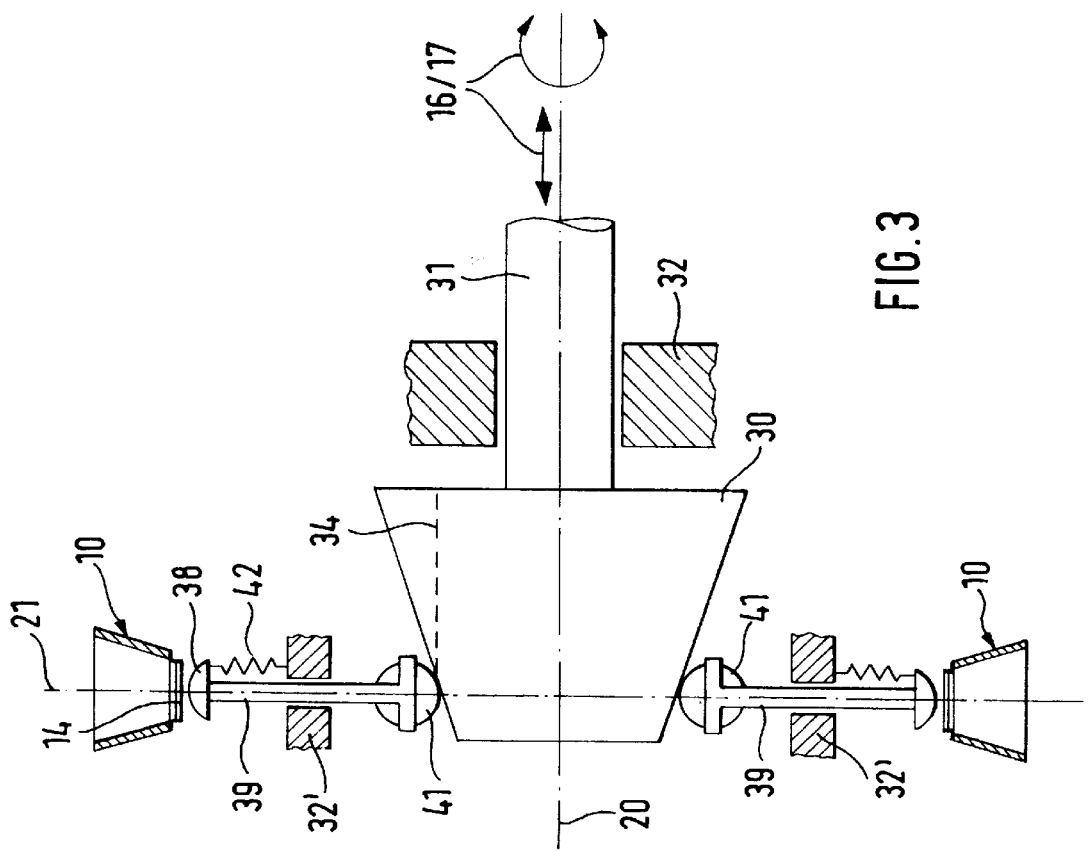
FIG. 3 is a section through a second embodiment of a lateral-thrust control arrangement according to the invention wherein the actuator is in an uncontrolled or idle flight mode.
Figure 5:
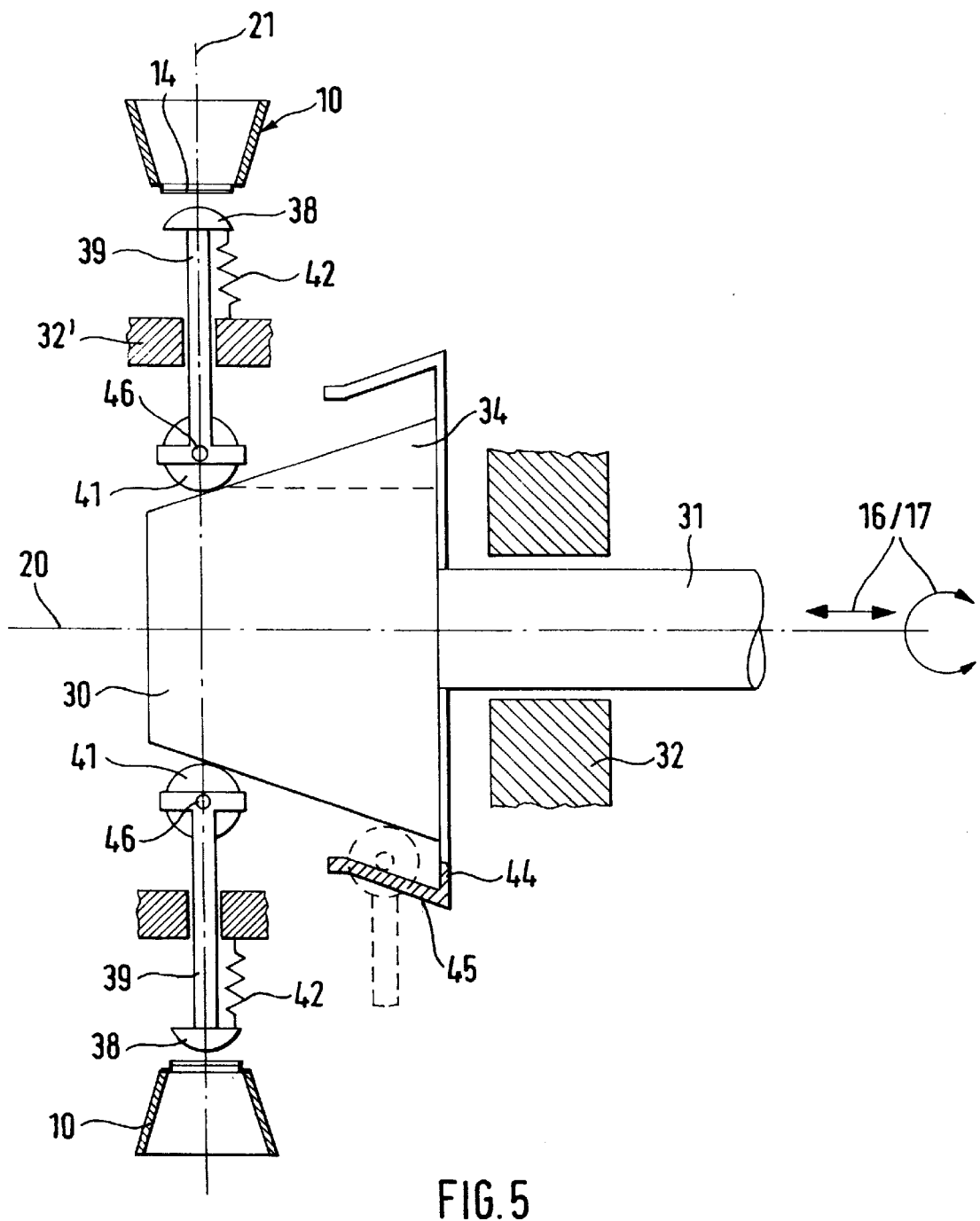
FIG. 5 shows the lateral-thrust control arrangement according to FIG. 3 with an additional restraint.

The embodiment shown in FIGS. 3 to 5 shows an indirect lateral-thrust nozzle control with separate blocking members between the actuator serving as the control means, and the inlets of the lateral-thrust nozzles.

In this embodiment, the actuator is constructed as a control cone 30 of frusto-conical shape and it is mounted for rotation and reciprocal, axial displacement by engagement of shaft 31 in missile structure 32. The shaft 31 is displaced by angular actuator 16 and linear actuator 17, in the manner as shown in FIG. 1.

Also, in this embodiment, four lateral-thrust nozzles 10 are provided in the missile structure and arranged in opposed pairs at right angles to one another so that the nozzles can be controlled intermittently and individually by a the central control means in the form of the control cone 30. For this purpose, one or more control grooves 34 and 36 are provided in the periphery of control cone 30 and the grooves extend parallel to the axis of shaft 31. The periphery of the control cone is thereby interrupted by the control grooves. A blocking component is assigned to each lateral-thrust nozzle and comprises a disk valve 38 for selectively seating on a seat at inlet 14 of the respective lateral-thrust nozzle. A valve tappet 39 is mounted in structure 32' and carries a contact roller 41 at its free end, and spring 42, acts on the valve 38 to urge the valve to an open position as shown in FIG. 3. The axes 21 of the valve members extend perpendicularly to the axis 20 of control cone 30.

The central control unit is shown in FIG. 3 in an idle position having no influence on the flight mode, in which the valve tappets are engaged in the region of smallest diameter of control cone 30 and the valves 38 are urged by springs 42 to open positions for nozzles 10. In particular, the contact rollers 41 engage the surface of the control cone 30 in the region without the grooves 34.

As soon as a controlled flight mode i.e. a guidance control is to be conducted, the control cone 30 is brought via angular actuator 16 into the required angular position, i.e. rotated into the required lateral-thrust position, in which control groove 34 is in correspondence with the roller 41 to be actuated, and then the cone 30 is moved by linear actuator 17 axially to the left in FIG. 3 along axis 20. Thereby, all valves 38 are moved, in opposition to the action of springs 42 to a closed position by which the gas flow to the lateral-thrust nozzles is interrupted except for the lateral-thrust nozzle, whose roller 41 is received in one of the control grooves 34 as a consequence of the adjusted angular position of the control cone 30. Hence, the valve associated with this roller remains in the initial or open position shown in FIG. 3, since the groove 34 in the control cone prevents the peripheral surface of the control cone from displacing the roller 41 and closing the valve 38. The cross-section of the grooves 34 corresponds to the diameter of rollers 41.

The selected lateral-thrust nozzle alone is now in fluid connection with the combustion chamber (not shown in FIG. 3) and alone now produces the required lateral-thrust component on the missile.

Thus, three of the four lateral-thrust nozzles arranged at the 0°, 90°, 180° and 270° angular positions are closed due to the described control motion, so that the combustion-chamber pressure increases very rapidly, which leads to the increase in the rate of combustion in the combustion chamber and a lateral-thrust force that is as large as possible is produced through the open lateral-thrust nozzle.

The high combustion-chamber pressure produces large forces on the closed valves to tightly seat the valves so that no pressure losses can occur thereat.

In order to securely open the closed disk valve upon reverse travel of control cone 30, a restraint element 44 is arranged, as shown in FIG. 5, in the region of the maximum diameter of the control cone 30. Element 44 has a free arm 45 which grasps a pin 46 on the associated roller 41, so that the respective valve 38 is forcibly urged to the open position when the control cone 30 returns to the rest position shown in FIG. 5 in which no lateral control force is applied to the missile.

In this way, it is assured that when a valve 38 is closed it is held fast due to high pressure and is returned to its open position upon reverse travel of the control cone.

The operation of the above-described embodiment essentially corresponds to that of the embodiment of FIGS. 1 and 2. It is common in both embodiments that the control unit or actuator 12 or 30 effects both the adjustment of the combustion-chamber pressure as well as the respective direct control of the corresponding thrust direction. Therefore, it is assured that the combustion-chamber pressure is lower in the idling mode and thus also the rate of combustion of the solid propellant is lower, whereas in a thrust mode, the combustion-chamber pressure is controlled to increase as a consequence of the three closed lateral-thrust nozzles and high thrust can be produced at the one open lateral-thrust nozzle along the respective axis in the Cartesian coordinate system.

Since the propellant is utilized specifically only for producing thrust in the selected direction and not also for maintaining a total system thrust capacity, which would lead to a continual thrust supply of all component directions, the propellant consumption is minimized.

The idling pressure ratios can be adjusted by selection of the valve sealing seat geometry. In this way, it is possible to adjust the corresponding pressure decrease ratios in the combustion chamber by an appropriate adjustment of the control cone along its axis 20, which presumes a correspondingly later or earlier engagement of the roller of the respective valve tappet in the assigned control groove.

The pressure/time gradient during the build-up and decrease of the combustion-chamber pressure can be adjusted also by an appropriate control program for operating the control cone relative to axis 20. Finally, the cone angle of the control cone of actuator 30 and the extent of its linear motion are selected as a function of the adjustment path of valve members 38, 39 necessary for a change in pressure in the solid-fuel hot-gas generator 13.

The selection of materials resistant to high temperature for the described lateral-thrust control arrangement is dependent on the type of propellant used, the necessary combustion temperature in the combustion chamber, and the combustion time corresponding to the required duration of the control of the missile.

For this purpose, durable materials that can resist high temperatures of up to approximately 2,500° C. are suitable, particularly for the valve and seat combination of the control means that is highly stressed thermally and. In addition, the control members and/or actuators are accommodated in a heat-insulated manner relative to the combustion chamber.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. A lateral thrust control apparatus for a missile comprising:
   a plurality of lateral thrust nozzles on the missile for communicating with a gas generator to produce a lateral thrust on the missile, a valve for each nozzle so that the nozzle is opened and closed, and a common actuator to operate each valve between open and closed positions for the respective nozzle to control flow of gases from said gas generator to said nozzles, said actuator being supported for reciprocal travel along an axis and for rotation movement around said axis, and being configured to open a selected individual nozzle while the other nozzles are closed based on a particular respective position of the actuator along and around said axis, wherein said actuator has a conical outer peripheral surface and is provided with a longitudinal control groove in said peripheral surface parallel to said axis, and wherein each said valve for each nozzle comprises a valve seat at said nozzle, a valve member for opening and closing said seat, a spring acting to open said valve, a rod connected to said valve member, a roller on said rod engaged with the peripheral surface of the actuator such that in an initial position of the actuator, the valves are all open and no net lateral thrust is produced on the missile and in an active position of the actuator, the actuator is axially and rotationally positioned so that the roller of a valve associated with a selected one of said nozzles is engaged in said groove so that said nozzle remains open while the rollers of the other of said nozzles are engaged with the peripheral surface of the actuator to close the respective valves.

2. Apparatus as claimed in claim 1, wherein in said initial position in which all nozzles are open no net lateral thrust is produced on the missile.

3. Apparatus as claimed in claim 1, wherein the conical surface of the actuator has a cone angle related to axial displacement of the actuator based on magnitude of displacement of said valves being closed in order to regulate pressure build-up in the gas generator when the valves are closed.

4. Apparatus as claimed in claim 3, wherein said rods connected to the valve members have free ends at which the rollers are attached.

5. Apparatus as claimed in claim 3, wherein said actuator further comprises a restraint member engageable with the rollers of the valves to promote initial opening of the valves when the actuator returns to its initial position.

6. Apparatus as claimed in claim 5, wherein each said roller includes a pin which engages said restraint member.

7. Apparatus as claimed in claim 1, wherein said nozzles are arranged in pairs at right angles to one another.

8. A lateral thrust control apparatus for a missile comprising:

a plurality of lateral thrust nozzles on the missile for communicating with a gas generator to produce a lateral thrust on the missile, a valve for each nozzle so that the nozzle is opened and closed, and a common actuator to operate each valve between open and closed positions for the respective nozzle to control flow of gases from said gas generator to said nozzles, said actuator being supported for reciprocal travel along an axis and for rotation movement around said axis, and being configured to open a selected individual nozzle while the other nozzles are closed based on a particular respective position of the actuator along and around said axis, wherein said actuator comprises a piston having a peripheral surface with a longitudinal channel therein parallel to said axis, said channel being in communication with the gas generator and being selectively in communication with one of said nozzles, depending on the axial and angular positions of the actuator, to produce a lateral thrust on the missile by flow of said gases to said one nozzle, and wherein said piston in an initial position of the actuator is axially disposed so that all of the nozzles are in communication with the gas generator and in an active position, the piston is axially and rotatably displaced to block communication of all of said nozzles with said gas generator except for said one nozzle.

9. Apparatus as claimed in claim 8, wherein said one nozzle which is selected is based on the rotation of the piston.

10. Apparatus as claimed in claim 1, wherein said longitudinal groove has a cross-section corresponding to said roller.

11. Apparatus as claimed in claim 1, wherein said nozzles are arranged radially around said actuator.

* * * * *